United States Patent
Isoda et al.

(10) Patent No.: US 10,447,181 B2
(45) Date of Patent: Oct. 15, 2019

(54) MOTOR CONTROL DEVICE, MOTOR UNIT INCLUDING SAID MOTOR CONTROL DEVICE, AUTOMOBILE INCLUDING MOTOR UNIT, AND MOTOR CONTROL METHOD

(71) Applicant: Panasonic Intellectual Property Management Co., Ltd., Osaka (JP)

(72) Inventors: Mineaki Isoda, Osaka (JP); Masahito Hidaka, Osaka (JP); Koji Kuyama, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 353 days.

(21) Appl. No.: 15/320,717

(22) PCT Filed: Sep. 25, 2015

(86) PCT No.: PCT/JP2015/004870
§ 371 (c)(1),
(2) Date: Dec. 20, 2016

(87) PCT Pub. No.: WO2016/051742
PCT Pub. Date: Apr. 7, 2016

(65) Prior Publication Data
US 2017/0129428 A1    May 11, 2017

(30) Foreign Application Priority Data
Sep. 30, 2014  (JP) .................................. 2014-200309

(51) Int. Cl.
*H02P 6/08* (2016.01)
*B60L 1/00* (2006.01)
(Continued)

(52) U.S. Cl.
CPC ................ *H02P 6/08* (2013.01); *B60L 1/003* (2013.01); *B60L 58/26* (2019.02); *H02P 27/08* (2013.01);
(Continued)

(58) Field of Classification Search
None
See application file for complete search history.

(56) References Cited

U.S. PATENT DOCUMENTS

2002/0027789 A1    3/2002  Okushima et al.
2006/0175995 A1    8/2006  Shinmura et al.
(Continued)

FOREIGN PATENT DOCUMENTS

| CN | 102906993 A | 1/2013 |
|----|-------------|--------|
| JP | 2-211092    | 8/1990 |

(Continued)

OTHER PUBLICATIONS

English Translation of Chinese Search Report dated Sep. 17, 2018 for the related Chinese Patent Application No. 201580042871.2.
(Continued)

*Primary Examiner* — John Olszewski
*Assistant Examiner* — Gerrard A Foster
(74) *Attorney, Agent, or Firm* — McDermott Will & Emery LLP

(57) ABSTRACT

Motor controller of the present invention is used in an automobile including wheel drive motor, wheel drive inverter, and cooling fan being an accessory. Wheel drive inverter drives wheel drive motor by PWM control at a primary carrier frequency. Cooling fan has fan motor being an accessory drive motor. Motor controller includes accessory drive inverter and frequency switch. Accessory drive inverter drives fan motor by PWM control at a secondary carrier frequency. Frequency switch switches a frequency of
(Continued)

the secondary carrier frequency based on the primary carrier frequency.

11 Claims, 9 Drawing Sheets

(51) Int. Cl.
*H02P 27/08* (2006.01)
*B60L 58/26* (2019.01)
*H02M 7/5387* (2007.01)
*H02M 1/00* (2006.01)

(52) U.S. Cl.
CPC ... *B60L 2240/545* (2013.01); *B60L 2270/142* (2013.01); *H02M 7/5387* (2013.01); *H02M 2001/008* (2013.01); *Y02T 10/642* (2013.01); *Y02T 10/7005* (2013.01); *Y02T 10/705* (2013.01); *Y02T 10/7258* (2013.01)

(56) References Cited

U.S. PATENT DOCUMENTS

| | | | | |
|---|---|---|---|---|
| 2013/0049666 | A1* | 2/2013 | Osugi | H02M 1/44 318/503 |
| 2015/0303859 | A1* | 10/2015 | Yamada | H02P 5/74 318/51 |

FOREIGN PATENT DOCUMENTS

| | | |
|---|---|---|
| JP | 2002-084790 | 3/2002 |
| JP | 2007-195336 | 8/2007 |
| JP | 4263697 B | 5/2009 |

OTHER PUBLICATIONS

International Search Report of PCT application No. PCT/JP2015/004870 dated Dec. 8, 2015.

\* cited by examiner

MOTOR CONTROL DEVICE, MOTOR UNIT INCLUDING SAID MOTOR CONTROL DEVICE, AUTOMOBILE INCLUDING MOTOR UNIT, AND MOTOR CONTROL METHOD

PRIORITY

This is a National Stage Application under 35 U.S.C. § 365 of International Application PCT/JP2015/004870, with an international filing date of Sep. 25, 2015, which claims priority to Japanese Patent Application No. 2014-200309 filed on Sep. 30, 2014. The entire disclosures of International Application PCT/JP2015/004870 and Japanese Patent Application No. 2014-200309 are hereby incorporated herein by reference.

TECHNICAL FIELD

The present invention relates to a motor controller and a motor control method for an accessory drive motor of an accessory for use in an automobile, such as an electric vehicle or a hybrid vehicle, and relates to a motor unit, an automobile, and the like including the motor controller.

BACKGROUND ART

In recent years, a motor of a motor unit for use in an automobile, such as an electric vehicle or a hybrid vehicle, has been required to satisfy the following conditions. That is, the motor requires quietness to provide comfort in the interior of an automobile. The motor is also required to be compact, high powered, and highly efficient since it is mounted in an automobile or a limited space. An electric vehicle, a hybrid vehicle, and the like are referred to as an electric vehicle (EV) in the following description.

Also in the following description, a motor unit for use in an automobile refers to a motor unit other than for a wheel drive motor for driving the automobile. The motor unit for use in an automobile includes, for example, a cooling fan to cool a battery, an electric pump to control hydraulic pressure, and an actuator to vary the blowing air volume of air conditioning. These motor units may be collectively referred to as an accessory.

Incidentally, inverter control is known as a method of driving a motor. Pulse width modulation (PWM) control is a type of inverter control. When a motor is driven by PWM control, a low carrier frequency reduces the increase in the amount of heat due to switching losses in the motor. A low carrier frequency also reduces the decrease in energy efficiency when the motor is driven.

Meanwhile, a wheel drive motor for driving EV changes, for example, its output power when operated by a driver. Behavior of the wheel drive motor, that is, the operating condition of the wheel drive motor is apparent to an occupant of EV. Thus, the occupant of EV can tolerate the operating sound emitted from the wheel drive motor to some extent.

The wheel drive motor can be driven by PWM control where the carrier frequency can be changed. When the wheel drive motor is driven by PWM control, the carrier frequency may be switched to a low frequency in an audible range depending on the operating condition of the wheel drive motor. When the carrier frequency is switched to the low frequency in the audible range, the wheel drive motor achieves both efficiency improvement due to the reduction of switching losses and improvement of comfort due to the reduction of noise.

Prior art documents in this field include, for example, PTL 1.

CITATION LIST

Patent Literature

PTL 1: Japanese Patent No. 4,263,697

SUMMARY OF THE INVENTION

A motor controller to which the present invention is directed is used in an automobile including a wheel drive motor, a wheel drive inverter, and an accessory.

The wheel drive inverter drives the wheel drive motor by PWM control at a primary carrier frequency. The accessory has an accessory drive motor.

The motor controller includes an accessory drive inverter and a frequency switch. The accessory drive inverter drives the accessory drive motor by PWM control at a secondary carrier frequency. The frequency switch switches a frequency of the secondary carrier frequency based on the primary carrier frequency.

DESCRIPTION OF EMBODIMENTS

A motor controller according to an exemplary embodiment of the present invention, which is configured as described below, synchronizes a primary carrier frequency used in a wheel drive inverter and a secondary carrier frequency used in an accessory drive inverter. Synchronization of the primary carrier frequency and the secondary carrier frequency can reduce the secondary carrier frequency. Thus, when an accessory drive motor of an accessory is driven, the motor controller can reduce switching losses. Accordingly, the motor controller according to the exemplary embodiment can be expected to achieve compactness, high output power, and high efficiency in driving the accessory.

Consequently, the motor controller according to the exemplary embodiment can reduce motor losses while providing an occupant of EV with comfort.

Thus, a conventional motor controller needs following improvement. That is, the accessory drive motor may operate regardless of the driver's intention unlike the wheel drive motor described above. In addition, behavior of the accessory drive motor is difficult to be understood by the occupant of EV.

For example, when a battery installed in EV generates heat, a cooling fan being an accessory is driven to cool the battery. Typically, a fan to cool a battery initiates operation directly based on the measurement of a battery temperature or the measurement of the ambient temperature of a battery, at which time the occupant cannot understand why the cooling fan operates. Therefore the occupant of EV cannot understand the effect of operating the cooling fan.

Accordingly, the occupant of EV hears only unpleasant noise due to the operation of the cooling fan. Comfort to the occupant of EV is reduced as a result.

To deal with this problem, a conventional motor controller may increase the secondary carrier frequency used in an accessory drive inverter to the inaudible range. Increasing the secondary carrier frequency to the inaudible range can provide the occupant of EV with quietness.

However, increasing the secondary carrier frequency to the inaudible range requires thermal solutions or the like in the conventional motor controller due to increased switching losses. The thermal solutions include attaching a heat sink and enlarging an IC chip package or IC chip size. As such, if the secondary carrier frequency is increased to the inaudible range, it is difficult for the conventional motor controller to achieve compactness, high output power, and high efficiency of the accessory.

Exemplary embodiments of the present invention will now be described with reference to the drawings. The exemplary embodiments described below are examples embodying the present invention and are not intended to limit the scope of the present invention.

First Exemplary Embodiment

Figure 1:
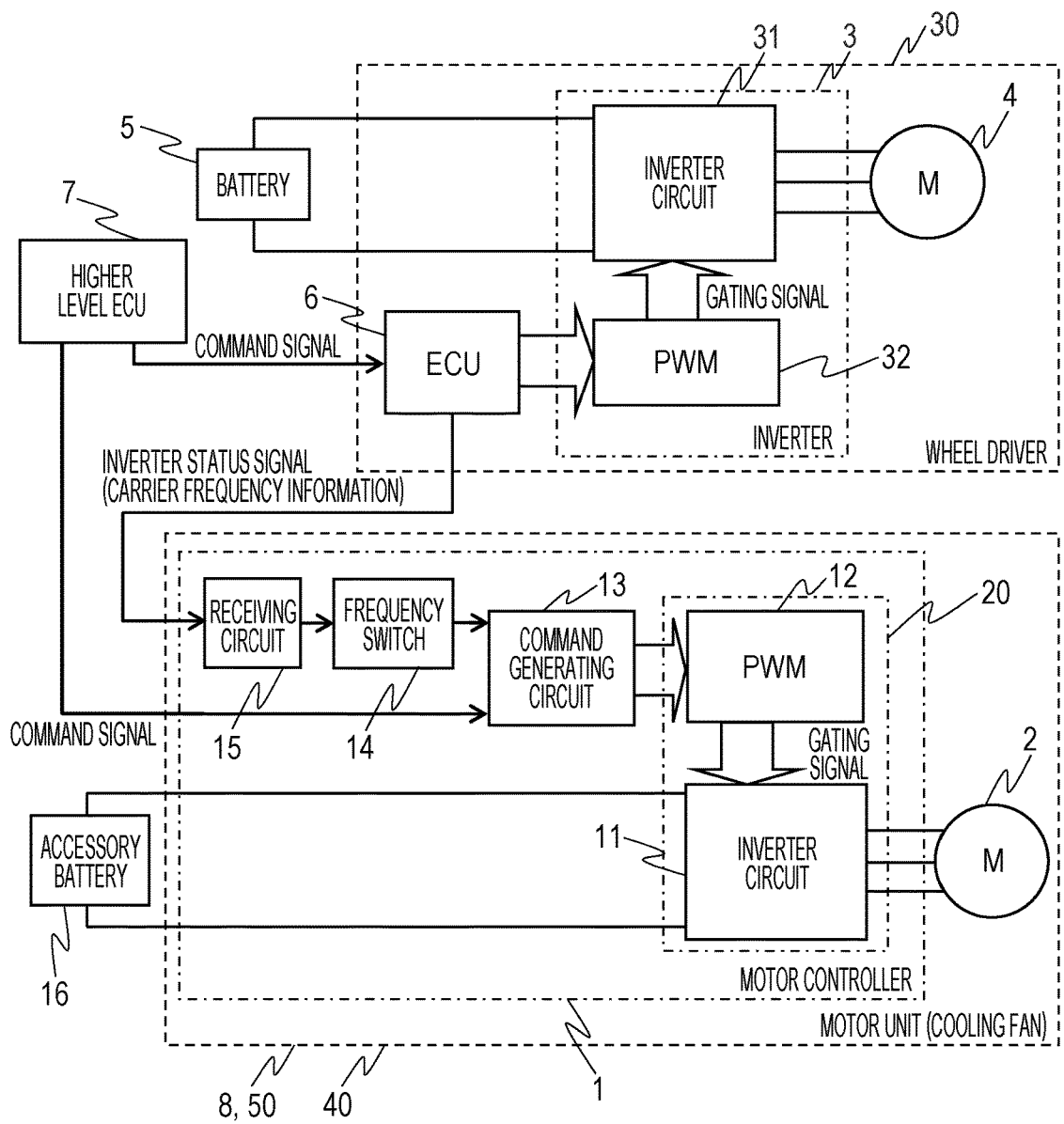
FIG. 1 is a block diagram schematically illustrating a motor controller according to a first exemplary embodiment of the present invention.
Figure 2:
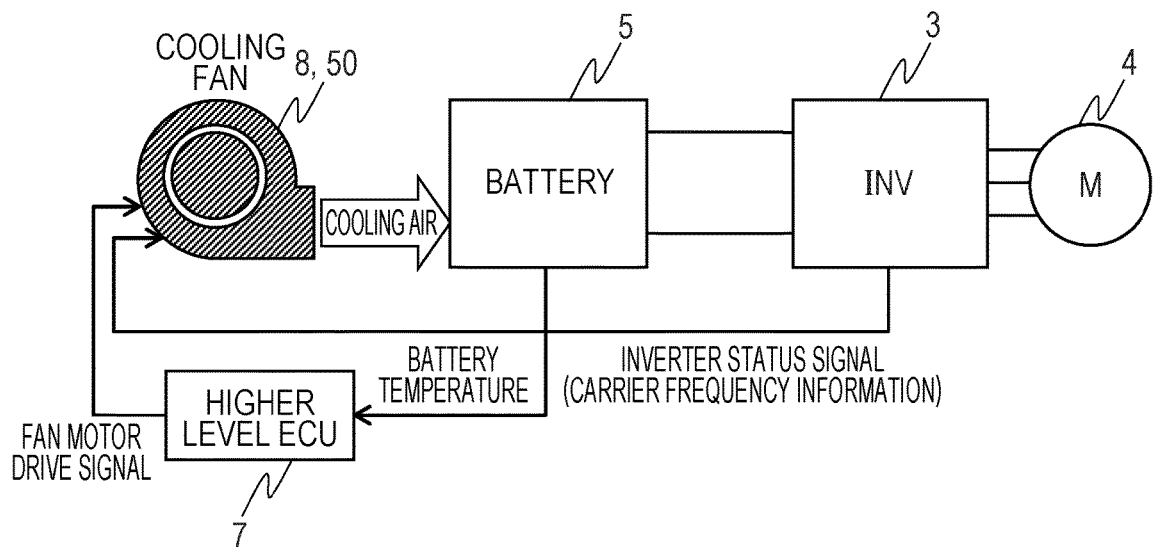
FIG. 2 is a diagram schematically illustrating the motor controller according to the first exemplary embodiment of the present invention.
Figure 3:
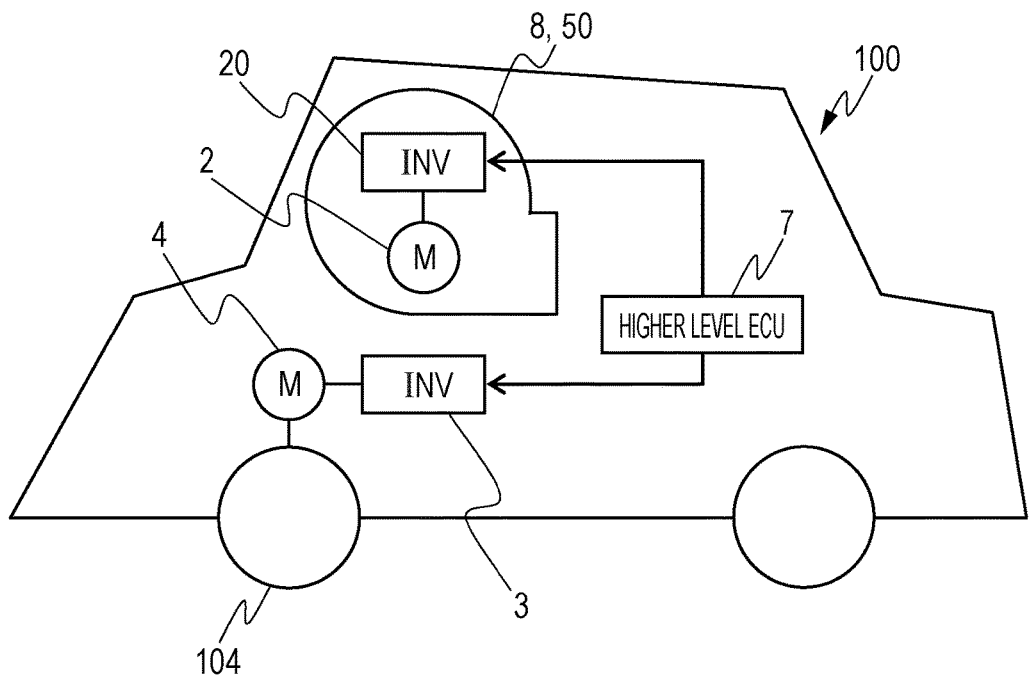
FIG. 3 is a block diagram schematically illustrating an automobile including the motor controller according to the first exemplary embodiment of the present invention.
Figure 4:
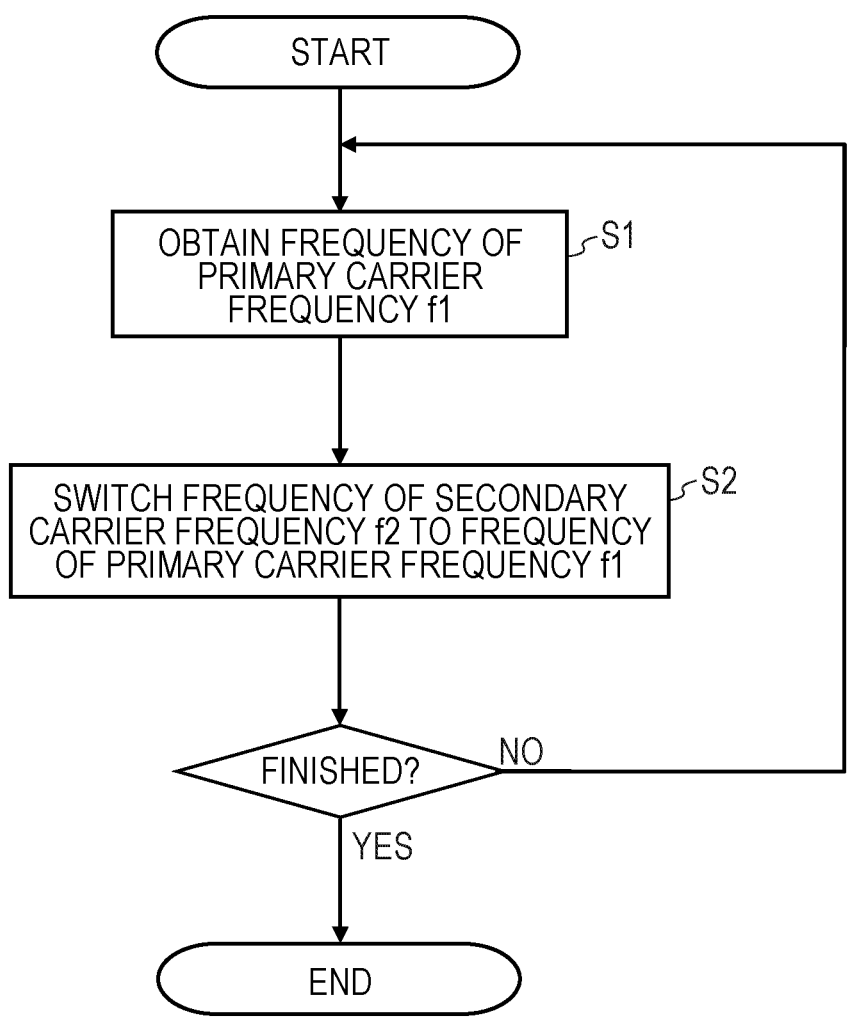
FIG. 4 is a flow chart illustrating a flow in the motor controller according to the first exemplary embodiment of the present invention.

FIG. 1 is a block diagram schematically illustrating a motor controller according to a first exemplary embodiment of the present invention. FIG. 2 is a diagram schematically illustrating the motor controller according to the first exemplary embodiment of the present invention. FIG. 3 is a block diagram schematically illustrating an automobile including the motor controller according to the first exemplary embodiment of the present invention. FIG. 4 is a flow chart illustrating a flow in the motor controller according to the first exemplary embodiment of the present invention.

As illustrated in FIGS. 1 through 3, motor controller 1 according to the first exemplary embodiment of the present invention is used in automobile 100 including wheel drive motor 4, wheel drive inverter 3, and cooling fan 8 being an accessory.

Wheel drive inverter 3 drives wheel drive motor 4 by PWM control at primary carrier frequency f1. Cooling fan 8 being an accessory includes fan motor 2 being an accessory drive motor.

Motor controller 1 includes accessory drive inverter 20 and frequency switch 14. Accessory drive inverter 20 drives fan motor 2 being an accessory drive motor by PWM control at secondary carrier frequency f2. Frequency switch 14 switches a frequency of secondary carrier frequency f2 based on primary carrier frequency f1.

In particular, a useful configuration is as follows; that is, motor controller 1 further includes receiving circuit 15 that is a frequency acquisition section for obtaining primary carrier frequency f1.

In motor controller 1, frequency switch 14 switches secondary carrier frequency f2 to the same frequency as primary carrier frequency f1.

Cooling fan 8 as an accessory, in which motor controller 1 is used, is illustrated in the first exemplary embodiment. Alternatively, motor controller 1 could be used in an accessory, such as an electric pump, actuator, or the like.

Motor unit 50 according to the first exemplary embodiment includes motor controller 1 and fan motor 2 being an accessory drive motor driven by motor controller 1. Motor unit 50 according to the first exemplary embodiment serves as cooling fan 8. Cooling fan 8 being motor unit 50 is driven in response to a command signal from higher level ECU 7.

Automobile 100 according to the first exemplary embodiment includes cooling fan 8 being motor unit 50 and higher level ECU 7 being a driver for driving cooling fan 8.

The motor controller according to the first exemplary embodiment involves a control method described below. That is, as illustrated in FIG. 4, a motor control method according to the first exemplary embodiment includes a step (S1) for obtaining primary carrier frequency f1 at which the wheel drive motor operates and a step (S2) for switching the frequency of secondary carrier frequency f2 based on primary carrier frequency f1 obtained.

More detailed description is made with reference to the drawings.

As illustrated in FIGS. 1 through 3, main system 30 for driving EV includes wheel drive motor 4 for causing the revolution of wheels 104, wheel drive inverter 3 for driving wheel drive motor 4, and ECU 6 that is an electronic control unit. Higher level ECU 7 controls various functions of automobile 100 in accordance with the instructions of an occupant. ECU 6 provides wheel drive inverter 3 with primary carrier frequency f1 in response to a command signal from higher level ECU 7.

Wheel drive inverter 3 includes inverter circuit 31, including a switching element, and PWM control circuit 32. PWM control circuit 32 provides switching signals that turn the switching element included in inverter circuit 31 on and off. The switching element included in inverter circuit 31 is PWM controlled by PWM control circuit 32.

ECU 6 generates primary carrier frequency f1 that turns the switching element included in inverter circuit 31 on and off. Primary carrier frequency f1 generated is transmitted from ECU 6 to PWM control circuit 32.

PWM control circuit 32 performs pulse width modulation with transmitted primary carrier frequency f1 as the fundamental frequency to generate a switching signal. The switching signal generated by PWM control circuit 32 is transmitted to inverter circuit 31 as a gating signal.

Inverter circuit 31 is supplied with power from battery 5. Inverter circuit 31 converts the power supplied from battery 5 to alternating current based on the gating signal transmitted. The power, after being converted into alternating current, is supplied to wheel drive motor 4 and drives wheel drive motor 4.

On the other hand, sub-system 40 for driving cooling fan 8 attached to EV includes fan motor 2, accessory drive inverter 20 for driving fan motor 2, and command generating circuit 13 for providing a control signal to accessory drive inverter 20.

Accessory drive inverter 20 includes inverter circuit 11, including a switching element, and PWM control circuit 12 for supplying switching signals to the switching element. The switching element included in inverter circuit 11 is PWM controlled by PWM control circuit 12.

Command generating circuit 13 generates secondary carrier frequency f2 that turns the switching element included in inverter circuit 11 on and off. Secondary carrier frequency f2 generated is transmitted from command generating circuit 13 to PWM control circuit 12.

PWM control circuit 12 performs pulse width modulation with transmitted secondary carrier frequency f2 as the fundamental frequency to generate a switching signal. The switching signal generated by PWM control circuit 12 is transmitted to inverter circuit 11 as a gating signal.

Inverter circuit 11 is supplied with power from accessory battery 16. Inverter circuit 11 converts the power supplied from accessory battery 16 to alternating current based on the gating signal transmitted. The power, after being converted into alternating current, is supplied to fan motor 2 and drives fan motor 2.

In the configuration described above, primary carrier frequency f1 calculated by ECU 6 of main system 30 is also transmitted to receiving circuit 15 as carrier frequency information in main system 30, as illustrated in FIGS. 1 and 4 (S1). The carrier frequency information is a signal indicative of the operating state of inverter-driven main system 30. Primary carrier frequency f1, which has been transmitted to receiving circuit 15, is transmitted to frequency switch 14.

Then, frequency switch 14 switches to a frequency of primary carrier frequency f1 as the carrier frequency for fan motor 2 instead of the frequency of secondary carrier frequency f2 used in the background art (S2).

In order to perform an operation instructed by higher level ECU 7, command generating circuit 13 calculates a new switching signal generated based on the frequency of primary carrier frequency f1 instead of the switching signal generated based on the frequency of secondary carrier frequency f2.

PWM control circuit 12 drives the switching element included in inverter circuit 11 based on the new switching signal.

Thus, the power supplied from accessory battery 16 is converted to alternating current and is supplied to fan motor 2.

As apparent from the above discussion, the motor controller according to the first exemplary embodiment obtains, through the receiving circuit, the frequency of primary carrier frequency f1 to control the wheel drive motor by PWM. By using the frequency switch, the motor controller switches the frequency of secondary carrier frequency f2 to control the accessory drive motor by PWM to the frequency of primary carrier frequency f1. Therefore, the motor controller can control the accessory drive motor by PWM at the same frequency as primary carrier frequency f1.

The wheel drive motor and the accessory drive motor are controlled in synchronization accordingly.

When motor controller 1 determines, based on the carrier frequency information indicative of the operating state of the inverter, that the inverter is stopped, frequency switch 14 switches secondary carrier frequency f2 to a predetermined frequency. The predetermined frequency is, for example, a high frequency of 14 kHz or more where it is inaudible. Such a control can reduce noise due to the natural frequency of the inverter when fan motor 2 is driven.

Second Exemplary Embodiment

Figure 5:
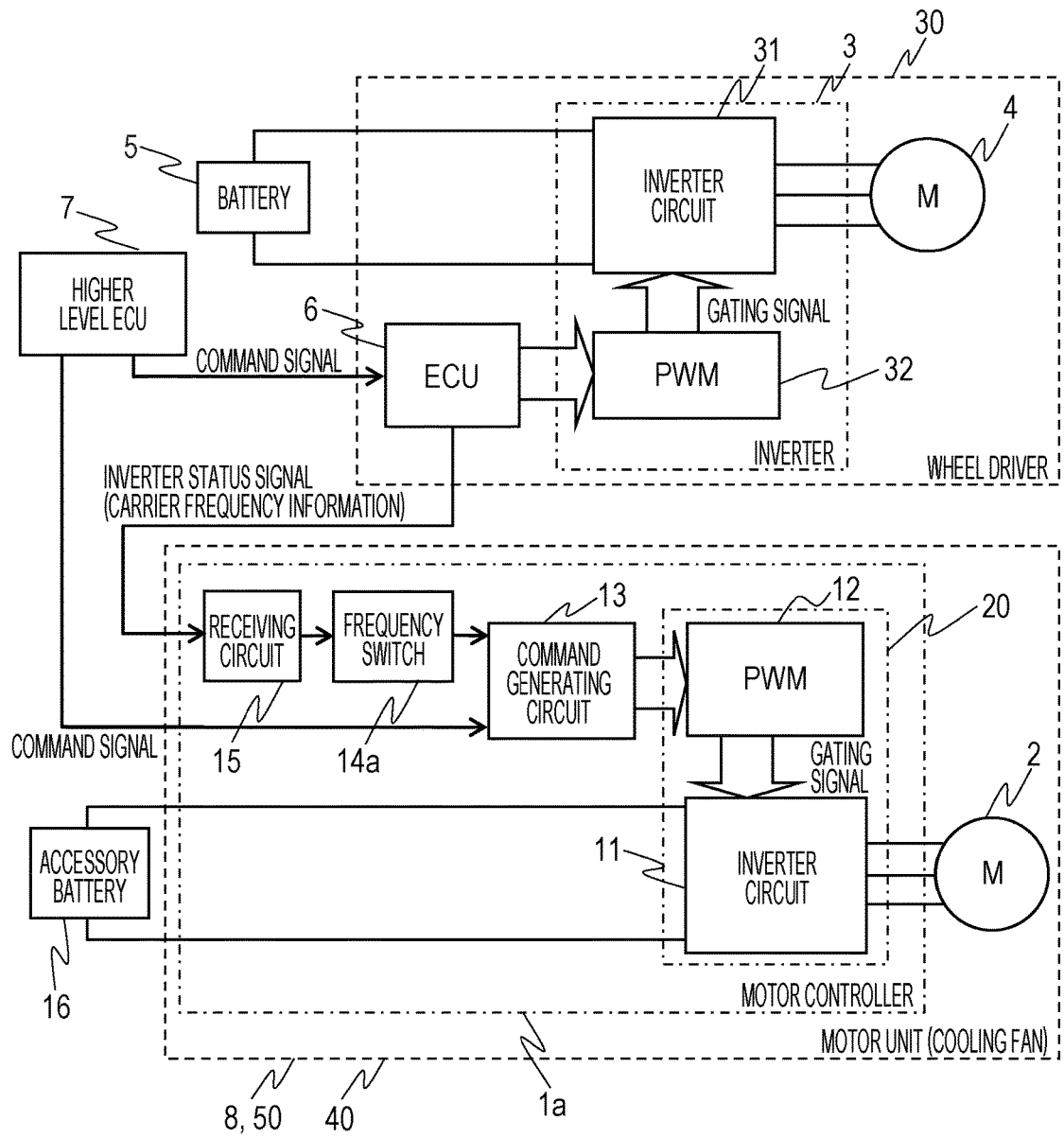
FIG. 5 is a block diagram schematically illustrating a motor controller according to a second exemplary embodiment of the present invention.
Figure 6:
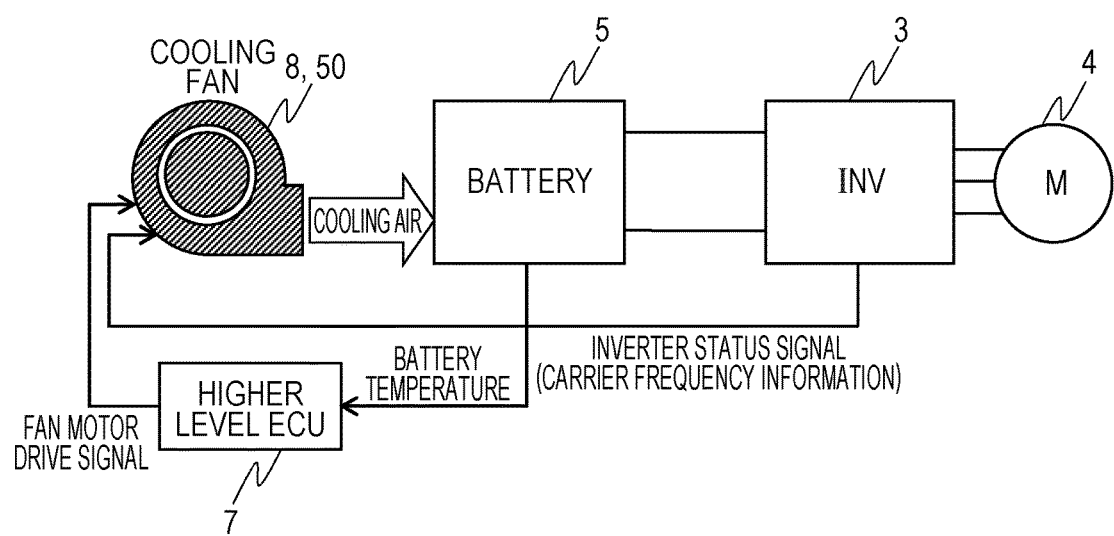
FIG. 6 is a diagram schematically illustrating the motor controller according to the second exemplary embodiment of the present invention.
Figure 7:
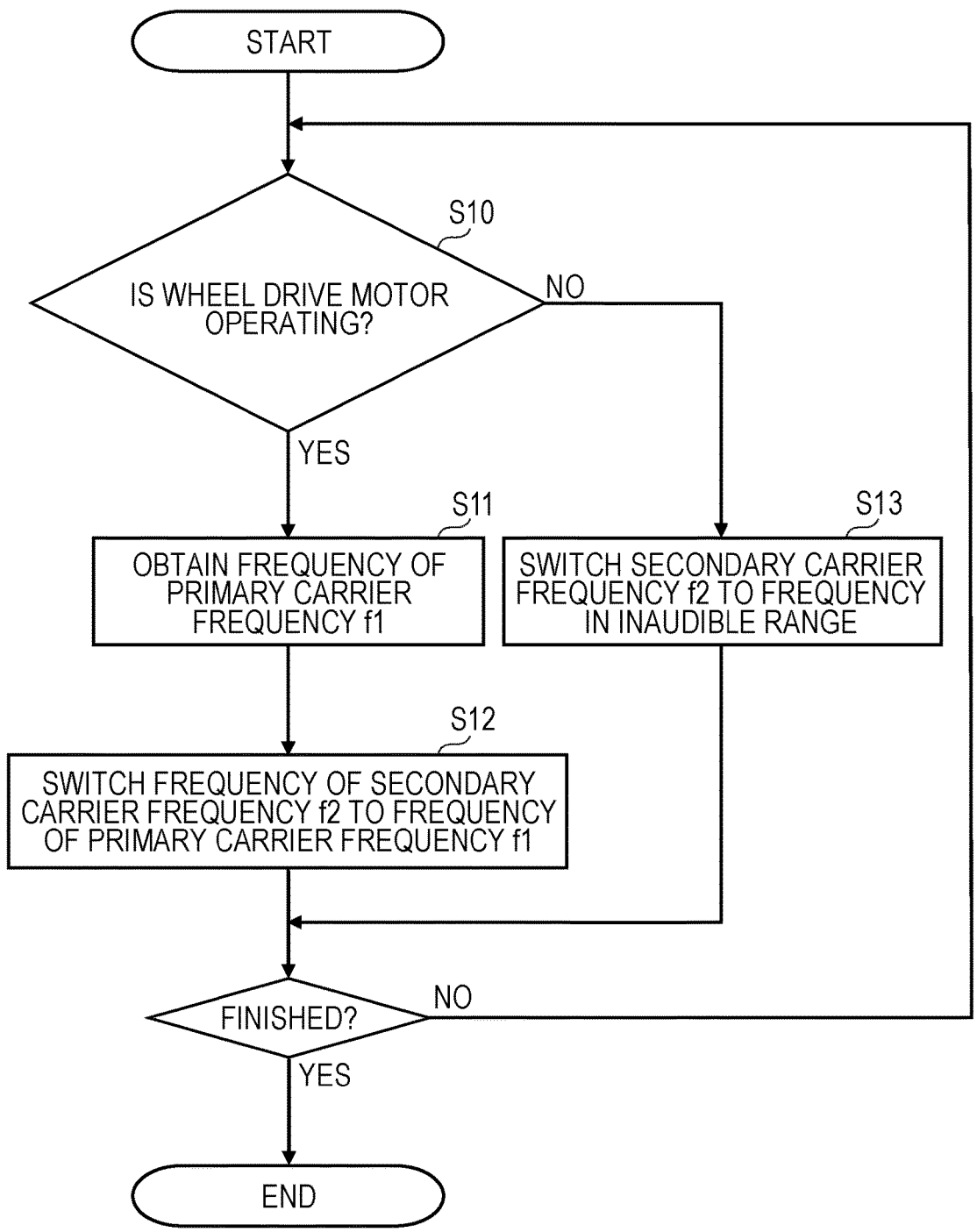
FIG. 7 is a flow chart illustrating a flow in the motor controller according to the second exemplary embodiment of the present invention.

FIG. 5 is a block diagram schematically illustrating a motor controller according to a second exemplary embodiment of the present invention. FIG. 6 is a diagram schematically illustrating the motor controller according to the second exemplary embodiment of the present invention. FIG. 7 is a flow chart illustrating a flow in the motor controller according to the second exemplary embodiment of the present invention.

A configuration similar to the motor controller according to the first exemplary embodiment is denoted by identical reference numerals, and the description thereof is incorporated by reference.

In motor controller 1a according to the second exemplary embodiment of the present invention, frequency switch 14a switches secondary carrier frequency f2 to the same frequency as primary carrier frequency f1 when wheel drive inverter 3 operates, as illustrated in FIG. 5. Frequency switch 14a also switches secondary carrier frequency f2 to a frequency in an inaudible range when wheel drive inverter 3 is stopped.

The motor controller according to the second exemplary embodiment involves a control method described below. That is, as illustrated in FIG. 7, a motor control method according to the second exemplary embodiment includes a determining step (S10) for determining whether the wheel drive motor is operating or stopped.

The motor control method according to the second exemplary embodiment includes a step (S11) for obtaining primary carrier frequency f1 at which the wheel drive motor operates when the determining step (S10) determines that the wheel drive motor is operating and a step (S12) for switching the frequency of secondary carrier frequency f2 based on primary carrier frequency f1 obtained.

The motor control method according to the second exemplary embodiment also includes a step (S13) for switching secondary carrier frequency f2 to a frequency in the inaudible range when the determining step (S10) determines that the wheel drive motor is stopped.

More detailed description is made with reference to the drawings.

As illustrated in FIGS. 5 and 6, wheel drive motor 4 for driving EV is supplied with power provided from battery 5 through wheel drive inverter 3. The power provided from battery 5 is converted from direct current to alternating current by switching operation of wheel drive inverter 3 with PWM control. The power, after being converted into alternating current, drives wheel drive motor 4.

Initially, as illustrated in FIGS. 5 and 7, motor controller 1a determines, based on the information from higher level ECU 7, whether wheel drive motor 4 is operating or stopped (S10).

If wheel drive motor 4 is operating, the carrier frequency information is transmitted from EUC 6 to receiving circuit 15. Motor controller 1a obtains the frequency of primary carrier frequency f1 based on the carrier frequency information transmitted (S11).

When EV is driven, battery 5 is charged and discharged. Battery 5 in which charging and discharging are carried out generates heat. If battery 5 is heated to a high temperature, the product life of battery 5 is shortened.

Accordingly, higher level ECU 7 monitors the temperature of battery 5 in the second exemplary embodiment, as illustrated in FIG. 6. The detected temperature of battery 5 is transmitted to higher level ECU 7. If the battery temperature transmitted is higher than a predetermined setting temperature, higher level ECU 7 drives cooling fan 8. When cooling fan 8 is driven, cooling air is directed to battery 5 so that battery 5 is actively cooled.

Then, as described in the first exemplary embodiment, the frequency of secondary carrier frequency f2 for driving cooling fan 8 is switched so that the frequency of secondary carrier frequency f2 is the same as primary carrier frequency f1 when wheel drive inverter 3 is controlled (S12). That is, motor controller 1a synchronizes primary carrier frequency f1 and secondary carrier frequency f2, and thus drives cooling fan 8 at the same frequency.

On the other hand, motor controller 1a may also determine, based on the information from higher level ECU 7, that wheel drive motor 4 is stopped (S10).

Then, secondary carrier frequency f2 is set to a carrier frequency of 14 kHz so that secondary carrier frequency f2 is a frequency in the inaudible range (S13).

In this case, since battery 5 is not charged or discharged, cooling fan 8 is less loaded. Thus, since cooling fan 8 is less loaded, total loss in cooling fan 8 being an accessory is not increased even if the frequency of secondary carrier frequency f2 to control fan motor 2 by PWM is increased.

Third Exemplary Embodiment

Figure 8:
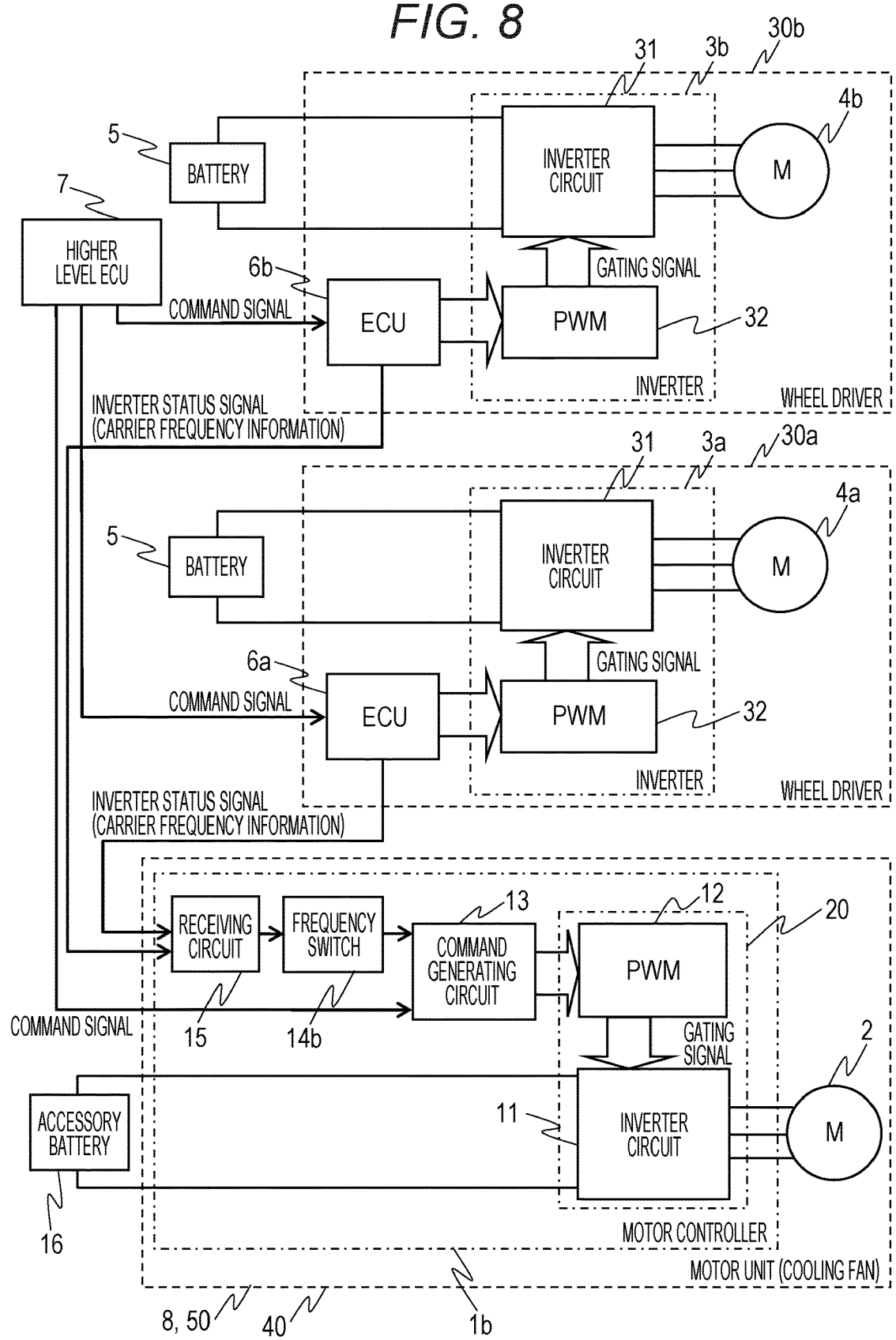
FIG. 8 is a block diagram schematically illustrating a motor controller according to a third exemplary embodiment of the present invention.
Figure 9:
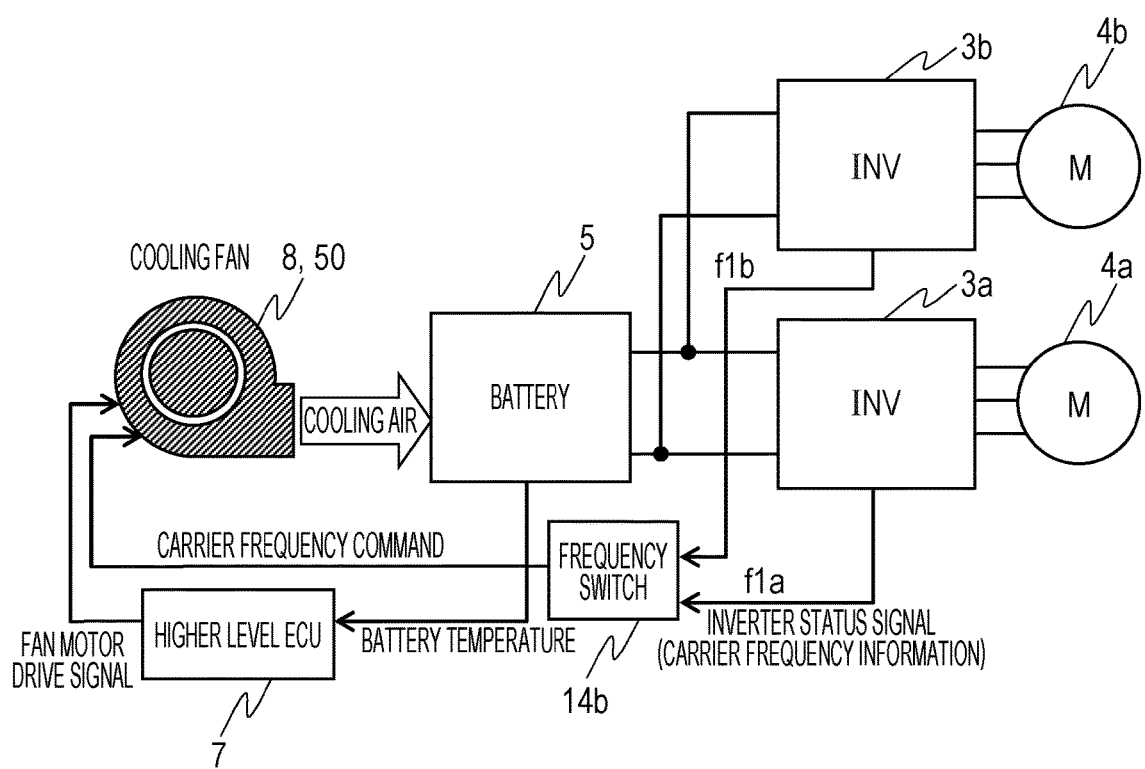
FIG. 9 is a diagram schematically illustrating the motor controller according to the third exemplary embodiment of the present invention.
Figure 10:
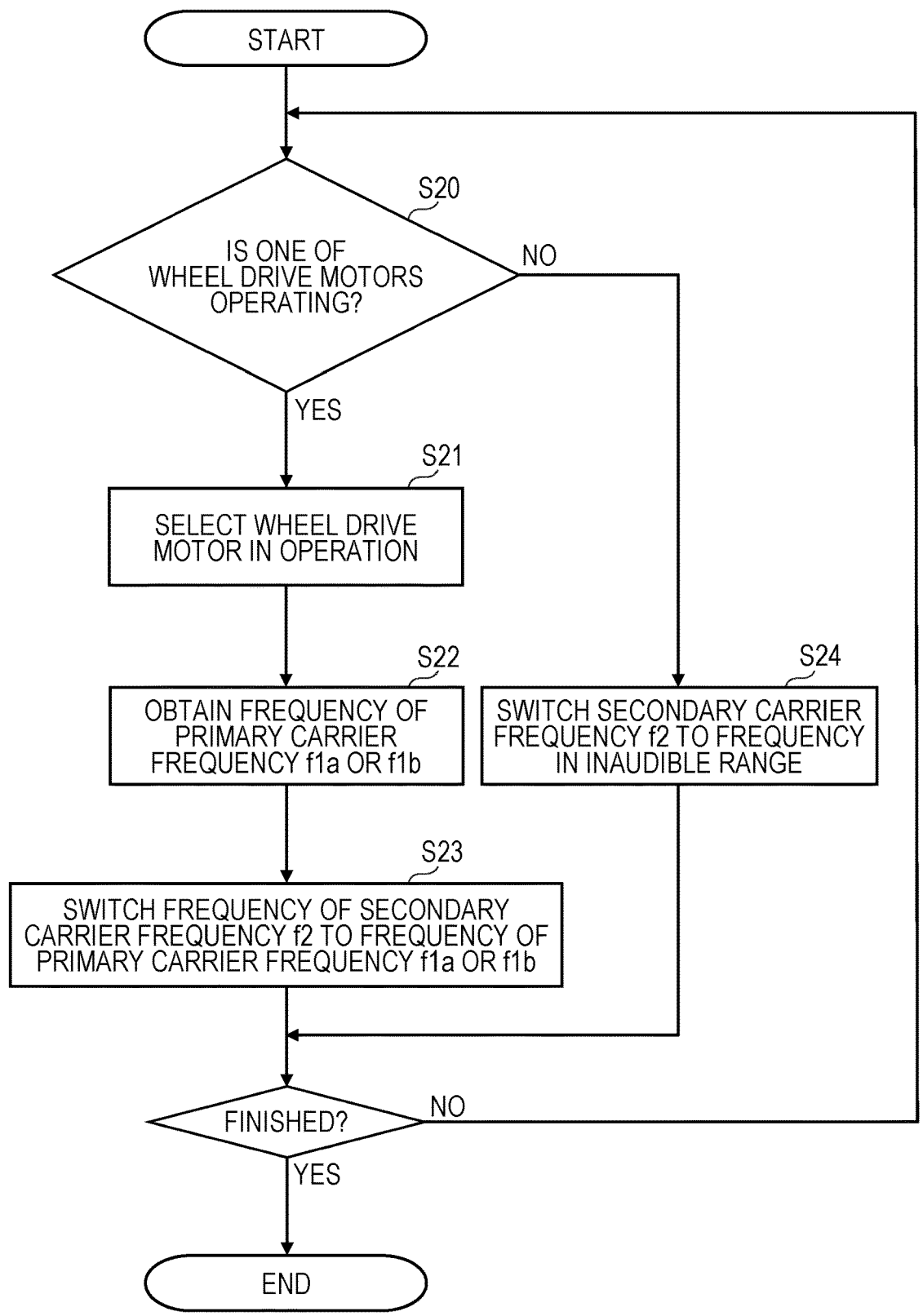
FIG. 10 is a flow chart illustrating a flow in the motor controller according to the third exemplary embodiment of the present invention.

FIG. 8 is a block diagram schematically illustrating a motor controller according to a third exemplary embodiment of the present invention. FIG. 9 is a diagram schematically illustrating the motor controller according to the third exemplary embodiment of the present invention. FIG. 10 is a flow chart illustrating a flow in the motor controller according to the third exemplary embodiment of the present invention.

A configuration similar to the motor controller according to the first and second exemplary embodiments is denoted by identical reference numerals, and the description thereof is incorporated by reference.

As illustrated in FIGS. 8 and 9, motor controller 1b according to the third exemplary embodiment of the present invention is used in an automobile.

The automobile includes first wheel drive motor 4a, first wheel drive inverter 3a, second wheel drive motor 4b, second wheel drive inverter 3b, and cooling fan 8 being an accessory and having fan motor 2 being an accessory drive motor.

First wheel drive inverter 3a drives first wheel drive motor 4a by PWM control at first primary carrier frequency f1a.

Second wheel drive inverter 3b drives second wheel drive motor 4b by PWM control at second primary carrier frequency f1b.

Accessory drive inverter 20 drives fan motor 2 being an accessory drive motor by PWM control at secondary carrier frequency f2.

When at least one of first wheel drive inverter 3a and second wheel drive inverter 3b operates, frequency switch 14b switches secondary carrier frequency f2 to the same frequency as one of first primary carrier frequency f1a and second primary carrier frequency f1b.

When both first wheel drive inverter 3a and second wheel drive inverter 3b stop, frequency switch 14b switches secondary carrier frequency f2 to a frequency in an inaudible range.

The motor controller according to the third exemplary embodiment involves a control method described below, as illustrated in FIG. 10. That is, a motor control method according to the third exemplary embodiment includes a determining step (S20) for determining whether at least one of the first wheel drive motor and the second wheel drive motor is operating or whether both the first wheel drive motor and the second wheel drive motor are stopped.

The motor control method according to the third exemplary embodiment includes a step (S22) for obtaining the primary carrier frequency of a wheel drive motor in operation when the determining step (S20) determines that at least one of the first wheel drive motor and the second wheel drive motor is operating; and a step (S23) for switching the frequency of secondary carrier frequency f2 based on primary carrier frequency f1a or f1b obtained.

The motor control method according to the third exemplary embodiment also includes a step (S24) for switching secondary carrier frequency f2 to a frequency in the inaudible range when the determining step (S20) determines that both the first wheel drive motor and the second wheel drive motor are stopped.

More detailed description is made with reference to the drawings.

As illustrated in FIGS. 8 and 9, first wheel drive motor 4a for driving EV is supplied with power provided from battery 5 through first wheel drive inverter 3a. Similarly, second wheel drive motor 4b for driving EV is supplied with power provided from battery 5 through second wheel drive inverter 3b.

The power provided from battery 5 is converted from direct current to alternating current by switching operation of wheel drive inverters 3a, 3b with PWM control. The power, after being converted into alternating current, drives wheel drive motors 4a, 4b.

When EV is driven, battery 5 is charged and discharged. Battery 5 in which charging and discharging are carried out generates heat. If battery 5 is heated to a high temperature, the product life of battery 5 is shortened.

Accordingly, higher level ECU 7 of the third exemplary embodiment monitors the temperature of battery 5 as illustrated in FIG. 9. The detected temperature of battery 5 is transmitted to higher level ECU 7. If the battery temperature transmitted is higher than a predetermined setting temperature, higher level ECU 7 drives cooling fan 8. When cooling fan 8 is driven, cooling air is directed to battery 5 so that battery 5 is actively cooled.

Initially, as illustrated in FIGS. 8 and 10, motor controller 1b determines, based on the information from higher level ECU 7, whether wheel drive motors 4a, 4b are operating or stopped (S20).

Next, if both first wheel drive inverter 3a and second wheel drive inverter 3b are operating, motor controller 1b selects which of wheel drive motors 4a, 4b to synchronize with in accordance with a predetermined criterion (S21). An example of a predetermined criterion is as follows; that is, a wheel drive motor to be selected is a motor with large output power. Otherwise, the selection is made by previously giving priority to the wheel drive motors.

Alternatively, if any one of wheel drive motors 4a, 4b is operating, respective carrier frequency information is transmitted from EUCs 6a, 6b respectively included in main systems 30a, 30b, to receiving circuit 15. Wheel drive motor 4a or 4b to be selected is naturally selected accordingly (S21).

Subsequently, motor controller 1b obtains the frequency of primary carrier frequency f1a or f1b based on the carrier frequency information transmitted (S22).

Then, as described in the first exemplary embodiment, the frequency of secondary carrier frequency f2 for driving cooling fan 8 is switched so that the frequency of secondary carrier frequency f2 is the same as one of primary carrier frequencies f1a, f1b when wheel drive inverters 3a, 3b are controlled, respectively (S23).

Motor controller 1b synchronizes one of primary carrier frequency f1a and primary carrier frequency f1b and secondary carrier frequency f2, and thus drives cooling fan 8 at the same frequency.

In other words, if first wheel drive inverter 3a is operating and second wheel drive inverter 3b is stopped, frequency switch 14b selects primary carrier frequency f1a. Motor controller 1b synchronizes primary carrier frequency f1a selected and secondary carrier frequency f2 and drives cooling fan 8 at the same frequency.

Otherwise, if second wheel drive inverter 3b is operating and first wheel drive inverter 3a is stopped, frequency switch 14b selects primary carrier frequency f1b. Motor controller 1b synchronizes primary carrier frequency f1b selected and secondary carrier frequency f2 and drives cooling fan 8 at the same frequency.

Meanwhile, motor controller 1b may also determine, based on the information from higher level ECU 7, that both wheel drive motors 4a, 4b are stopped (S20).

Then, secondary carrier frequency f2 is set to a carrier frequency of 14 kHz so that secondary carrier frequency f2 is a frequency in the inaudible range (S24). A carrier frequency of 14 kHz is within the inaudible range of human hearing.

As shown in FIGS. 8 and 9, the third exemplary embodiment illustrates the case where two wheel drive motors are employed, whereas the scope of the third exemplary embodiment also covers a case where three or more wheel drive motors are employed. That is, the motor controller according to the third exemplary embodiment can achieve similar effects even in the case where three or more wheel drive motors are employed.

The above description illustrates a cooling fan as an accessory. Alternatively, an accessory such as an electric oil pump or the like, which is electrical equipment driven by a motor, can achieve similar effects.

Accordingly, the use of the motor controller according to the exemplary embodiment can achieve the following effects even if EV is assembled by using components including individually optimized motors. That is, the motor controller according to the exemplary embodiment can synchronize the primary carrier frequency of the wheel drive inverter and the secondary carrier frequency of the accessory drive inverter. Synchronization of the primary carrier frequency and the secondary carrier frequency can prevent an occupant from hearing unpleasant noise even if an accessory operates.

The motor controller according to the exemplary embodiment reduces switching losses in the inverter. Thus, the accessory drive motor can be compact and highly powered.

INDUSTRIAL APPLICABILITY

The motor controller according to the present invention synchronizes the switching frequency of a wheel drive motor and the switching frequency of an accessory drive motor. Accordingly, the accessory drive motor can reduce switching losses using a low frequency without increasing the switching frequency to the inaudible range.

The present invention is useful for an accessory drive motor for use in an electric vehicle, hybrid vehicle, and the like that is required to be highly efficient, compact, and high powered.

The invention claimed is:

1. A motor controller for use in an automobile including a wheel drive motor, a wheel drive inverter for driving the wheel drive motor by pulse width modulation (PWM) control at a primary carrier frequency, and an accessory having an accessory drive motor, the motor controller comprising: an accessory drive inverter for driving the accessory drive motor by PWM control at a secondary carrier frequency; and a frequency switch for switching a frequency of the secondary carrier frequency based on the primary carrier frequency=wherein the frequency switch switches the secondary carrier frequency to the same frequency as the primary carrier frequency when the wheel drive inverter operates: and the frequency switch switches the secondary carrier frequency to a frequency in an inaudible range when the wheel drive inverter stops.

2. The motor controller according to claim 1, wherein the frequency switch switches the secondary carrier frequency to the same frequency as the primary carrier frequency.

3. An automobile comprising:
a motor unit comprising the motor controller according to claim 1 and the accessory drive motor driven by the motor controller; and
a driver for driving the motor unit.

4. The motor controller according to claim 1, wherein the accessory is a cooling fan.

5. The motor controller according to claim 1, wherein the accessory is an electric pump.

6. A motor control method for controlling the motor controller according to claim 1, the motor control method comprising the steps of:
obtaining the primary carrier frequency at which the wheel drive motor operates; and
switching the frequency of the secondary carrier frequency based on the primary carrier frequency obtained.

7. A motor control method for controlling the motor controller according to claim 1, the motor control method comprising the steps of:
determining whether the wheel drive motor is operating or stopped;
obtaining the primary carrier frequency at which the wheel drive motor operates, when the determining step determines that the wheel drive motor is operating;
switching the frequency of the secondary carrier frequency based on the primary carrier frequency obtained; and
switching the secondary carrier frequency to a frequency in an inaudible range when the determining step determines that the wheel drive motor is stopped.

8. A motor controller for use in an automobile including a first wheel drive motor, a first wheel drive inverter for driving the first wheel drive motor by pulse width modulation (PWM) control at a first primary carrier frequency, a second wheel drive motor, a second wheel drive inverter for driving the second wheel drive motor by PWM control at a second primary carrier frequency, and an accessory having an accessory drive motor, the motor controller comprising: an accessory drive inverter for driving the accessory drive motor by PWM control at a secondary carrier frequency; and a frequency switch for switching the secondary carrier frequency to the same frequency as one of the first primary carrier frequency and the second primary carrier frequency when at least one of the first wheel drive inverter and the second wheel drive inverter operates and for switching the secondary carrier frequency to a frequency in an inaudible range when both the first wheel drive inverter and the second wheel drive inverter stop.

9. A motor control method for controlling the motor controller according to claim 8, the motor control method comprising the steps of:
- determining whether at least one of the first wheel drive motor and the second wheel drive motor is operating or whether both the first wheel drive motor and the second wheel drive motor are stopped;
- obtaining the first primary carrier frequency of the first wheel drive motor and the second primary carrier frequency of the second wheel drive motor in operation when the determining step determines that at least one of the first wheel drive motor and the second wheel drive motor is operating;
- switching the frequency of the secondary carrier frequency based on the primary carrier frequency obtained; and
- switching the secondary carrier frequency to the frequency in an inaudible range when the determining step determines that both the first wheel drive motor and the second wheel drive motor are stopped.

10. The motor controller according to claim 8, wherein the accessory is a cooling fan.

11. The motor controller according to claim 8, wherein the accessory is an electric pump.

\* \* \* \* \*